(12) United States Patent
Nakasako

(10) Patent No.: US 8,506,450 B2
(45) Date of Patent: Aug. 13, 2013

(54) HYBRID VEHICLE

(75) Inventor: Toru Nakasako, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 223 days.

(21) Appl. No.: 13/139,703

(22) PCT Filed: Jan. 25, 2010

(86) PCT No.: PCT/JP2010/050913
§ 371 (c)(1),
(2), (4) Date: Jun. 14, 2011

(87) PCT Pub. No.: WO2010/087311
PCT Pub. Date: Aug. 5, 2010

(65) Prior Publication Data
US 2011/0269599 A1    Nov. 3, 2011

(30) Foreign Application Priority Data

Jan. 27, 2009  (JP) ................. 2009-015790

(51) Int. Cl.
*B60W 10/02* (2006.01)
*F16H 3/08* (2006.01)

(52) U.S. Cl.
USPC ................. 477/5; 74/331

(58) Field of Classification Search
USPC ............ 477/5; 475/5, 151; 74/330, 331, 74/335, 340; 180/65.265
See application file for complete search history.

(56) References Cited

U.S. PATENT DOCUMENTS

| | | | |
|---|---|---|---|
| 5,875,691 A | 3/1999 | Hata et al. | |
| 6,499,370 B2 * | 12/2002 | Bowen | 74/330 |
| 7,256,510 B2 * | 8/2007 | Holmes et al. | 290/45 |
| 7,575,529 B2 * | 8/2009 | Holmes | 475/5 |
| 2007/0259748 A1 | 11/2007 | Forsyth | |
| 2010/0317476 A1 * | 12/2010 | Schoenek | 475/5 |
| 2012/0234133 A1 * | 9/2012 | Ikegami et al. | 74/661 |

FOREIGN PATENT DOCUMENTS

| | | |
|---|---|---|
| EP | 0 776 779 A2 | 6/1997 |
| FR | 2 822 758 A1 | 10/2002 |
| JP | 9-123773 A | 5/1997 |
| JP | 9-156388 A | 6/1997 |
| JP | 2002-89594 A | 3/2002 |
| JP | 2005-329813 A | 12/2005 |
| JP | 2008-143242 A | 6/2008 |

* cited by examiner

OTHER PUBLICATIONS

European Supplemental Search Report dated Mar. 20, 2012 issued in European counterpart application No. 10735779.0.

*Primary Examiner* — Roger Pang
(74) *Attorney, Agent, or Firm* — Arent Fox LLP

(57) ABSTRACT

Disclosed is a hybrid vehicle with a transmission, the transmission including a transmission input shaft (25) to which the power from the engine is transmitted, transmission output shafts (26, 27) from which a power for driving a driven section is outputted, a first input shaft (21) which is connectable to the transmission input shaft (25) via a first clutch (CL1) of a twin clutch unit (20), a second input shaft (22) which is connectable to the transmission input shaft (25) via a second clutch (CL2), gear trains (G1 to GR) which are configured so that the gear trains can be selected to connect the first input shaft (21) and the second input shaft (22) to the transmission output shafts (26, 27), and a connection device (SM1) which can be selectively switched between a first operation state for enabling power transmission between the output shaft of an electric motor (3) and the transmission input shaft (25) and a second operation state for interrupting the power transmission therebetween.

9 Claims, 11 Drawing Sheets

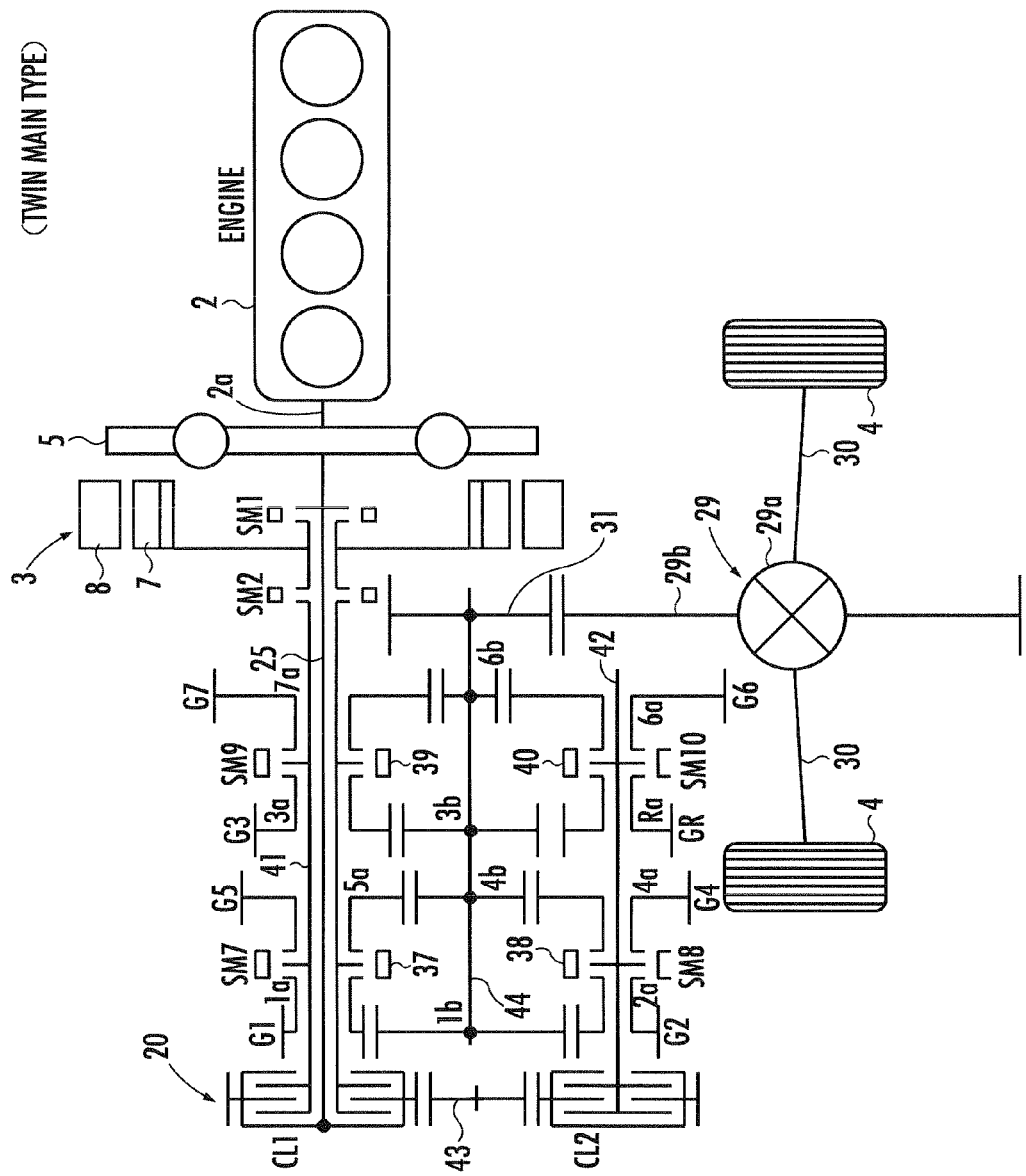

HYBRID VEHICLE

CROSS-REFERENCE TO RELATED APPLICATION

This application is a National Stage entry of International Application No. PCT/JP2010/050913, having an international filing date of Jan. 25, 2010; which claims priority to Japanese Application No.: 2009-015790, filed Jan. 27, 2009, the disclosure of each of which is hereby incorporated in its entirety by reference.

TECHNICAL FIELD

The present invention relates to a hybrid vehicle which is installed with a twin (or dual) clutch type transmission (DCT) and which uses in combination a motor (engine) and an electric motor as power sources.

BACKGROUND ART

There is proposed a hybrid vehicle with a twin clutch type transmission combined with an electric motor, having a structure of providing the electric motor at the downstream side of the clutch of the DCT. In this structure, loss due to clutch control is reduced since it is able to drive and regenerate by the electric motor even in a state when the twin clutch is not engaged.

For example, as disclosed in Patent Document 1, a double clutch transmission device having two input shafts and one output shaft and a number of gear trains between the input shaft and the output shaft, the gear trains comprising a loose gear capable of being non-rotatably coupled to one of the shafts and a fixed gear non-rotatably disposed at a shaft which meshes with the loose gear.

Moreover, Patent Document 2 discloses a hybrid vehicle installed with a dual clutch type transmission.

PRIOR ART

Patent Document

Patent Document 1: Japanese Patent Laid-Open Publication No. 2002-089594

Patent Document 2: Japanese Patent Laid-Open Publication No. 2005-329813

SUMMARY OF THE INVENTION

Problems to be Solved by the Invention

However, the conventional art as described above has following inconveniences.

When starting the engine from a vehicle stopped state, since the engine and the electric motor is connected by engaging one of the twin clutch, it is necessary to have an actuator of the twin clutch which is operable from a halt state (for example, an electric oil pump), which increases the cost and weight.

Moreover, since the electric motor is disposed at front, back or at the side of the transmission, the total length or the total width of the transmission becomes large, and the dimension and the weight of the engine room, thus the vehicle itself, becomes large thereby increasing the manufacturing cost and the fuel consumption.

In a case where the electric motor is disposed at the rearward of the transmission, it is not able to sufficiently secure deflection angle of the drive shaft since the outer diameter of the electric motor is large. In this regard, if the outer diameter of the electric motor is minified, then the total length becomes too long to be housed within the engine room. Therefore, it was difficult to dispose such transmission in a transverse FF vehicle in view of space.

Moreover, in a case where the twin clutch is embedded inside the electric motor, since the rotor diameter and the total length of the transmission becomes large, and it is not able to be housed in the engine room, thereby necessitating to enlarge the total width of the vehicle body.

In addition, since the clutch needs to be engaged when starting the engine by the electric motor, in order to actuate the clutch before starting the engine, it is necessary to additionally provide an actuator (for example, an electric oil pump) as the clutch operating source, which increases the cost and weight.

The present invention aims to solve the above problems and to provide a hybrid vehicle comprising a transmission which does not enlarge its total length or total width even if the electric motor is disposed at the clutch downstream side of the twin clutch, and which does not require to add any means which enables to actuate the twin clutch from a halt state.

Means for Solving the Problems

The present invention provides a hybrid vehicle comprising an engine and an electric motor as a power source for driving a driven section via a transmission, the transmission comprising, a transmission input shaft which transmits power from the engine and a transmission output shaft which outputs a power for driving the driven section, a twin clutch unit having a first clutch and a second clutch coaxially arranged with the transmission input shaft, a first input shaft which is connectable to the transmission input shaft via the first clutch and a second input shaft which is connectable to the transmission input shaft via the second clutch, gear trains configured to be switchable to connect each of the first input shaft and the second input shaft to the transmission output shaft, and a connection device which can be selectively switched between a first operation state for enabling power transmission between an output shaft of the electric motor and the transmission input shaft, and a second operation state for interrupting the power transmission, wherein the first input shaft and the second input shaft are arranged coaxially between the engine and the twin clutch unit, and are driven by the electric motor via the connection device and the twin clutch unit.

According to the present invention, by disposing the two clutches away from the engine and sandwiching the transmission, it is able to secure a place to dispose the electric motor, and at the same time to shorten the total width of the transmission.

Moreover, by disposing an electric motor having an output shaft which is intermittent, via a connection device, with respect the transmission input shaft connected to the two clutches of the twin clutch unit, it is able to connect the electric motor to the engine regardless of the connection state of the transmission, and to use the electric motor as the starter when starting the engine.

Moreover, since the electric motor can be connected to the engine separately from the twin clutch, it is able to start the engine without engaging the twin clutch. Therefore, it is not necessary to provide another device for enabling to engage the twin clutch from a halt state like in the conventional art, which is advantageous in view of cost and weight.

In the embodiment of the present invention, the electric motor is disposed between the engine and the transmission, and the connection device is disposed inside the electric motor. By this, it is not necessary to enlarge the size of the engine room to dispose the electric motor, and thus can be installed in various types of vehicles.

The transmission connects the electric motor to the transmission input shaft via the connection device at a time of cold start or in a case where a battery voltage is not more than a predetermined value, thereby starting the engine by the electric motor.

According to this aspect, it is able to connect the electric motor to the engine regardless of gear shift stage, and to use the electric motor as the starter for engine activation.

A second connection device is provided which can be selectively switched between a first operation state for enabling power transmission between the output shaft of the electric motor and the first input shaft or the second input shaft, and a second operation state for interrupting the power transmission.

According to this aspect, since the output shaft of the electric motor is connected to the input shaft of the twin clutch by the second connection device, EV traveling by the electric motor is possible without connecting to the engine.

The connection device or the second connection device is set to the first operation state according to a state of the vehicle at a time of stopping or just before stopping.

According to this aspect, in a case where EV start-moving by the electric motor is possible according to the state of the power source of the electric motor and the engine, the second connection device is set to the first operation state.

Moreover, in a case where EV start-moving is possible during vehicle stoppage, the transmission preliminarily sets a speed stage of odd-numbered or even-numbered gear stage by switching the gear trains, and when vehicle stoppage is released, EV traveling is started by a drive force of the electric motor, and when a vehicle body speed becomes equal to or more than a predetermined value, a torque of the electric motor is increased and by engaging the clutch connected to the gear train on a side which is not driven by the electric motor, the engine is activated by the drive of the electric motor.

According to this aspect, at the time of EV start-moving, since power is transmitted from the electric motor via the second connection device directly to the first input shaft or the second input shaft, power is transmitted to the output shaft via the gear trains. This enables the vehicle to start-moving immediately.

Next, when the vehicle speed becomes equal to or more than a predetermined value and it is determined that engine drive force is necessary, a transmission gear ratio of the gear train on the side which is not driven by the electric motor is selected to be higher than a transmission gear ratio of the other gear train, and then the clutch is engaged.

According to this aspect, in view of the electric motor, since the engine is activated while the speed is reduced, it is able to minify the electric motor torque necessary to activate the engine. That is, during EV traveling by the electric motor drive, it is able to start the engine by adding relatively small electric motor torque, thereby the electric motor torque area which enables EV traveling is enlarged and the fuel consumption is improved.

In addition, in a case where the engine rotation speed increases to a predetermined rotation speed when the engine is activated, the engine is started and the vehicle travels by maintaining a transmission gear ratio fixed, and when a vehicle body speed is less than a predetermined value, the engine is started after increasing the engine rotation speed to the electric motor rotation speed, and the vehicle travels by changing speed to an arbitrary gear stage by switching the gear trains.

In the embodiment of the present invention, in a case where a reverse gear stage is selected during vehicle stoppage, the transmission preliminarily sets the reverse gear stage by switching the gear trains, and at the time of start-moving, the first connection device is set to the first operation state, and then the engine is started by the drive of the electric motor, and the vehicle moves backward by the engine drive. This enables immediate reverse starting of the vehicle.

In a case where EV traveling by the electric motor is selected, the transmission sets a predetermined gear shift stage by switching the gear trains, and sets the second connection device to the first operation state, so that EV traveling by the electric motor at the gear shift stage is enabled.

At a time of deceleration traveling, the engine is set to a halt state, and a predetermined gear shift stage is set by switching the gear trains of the transmission, and regenerating electric power by the electric motor.

According to this aspect, fuel consumption is improved, since all the regeneration power is completely received by the electric motor while the engine is halted.

BRIEF EXPLANATION OF THE DRAWINGS

[FIG. 11] A diagram showing the total configuration of the power device of the second embodiment of the present invention.

BEST MODE FOR CARRYING OUT THE INVENTION

[The First Embodiment]

Figure 1:
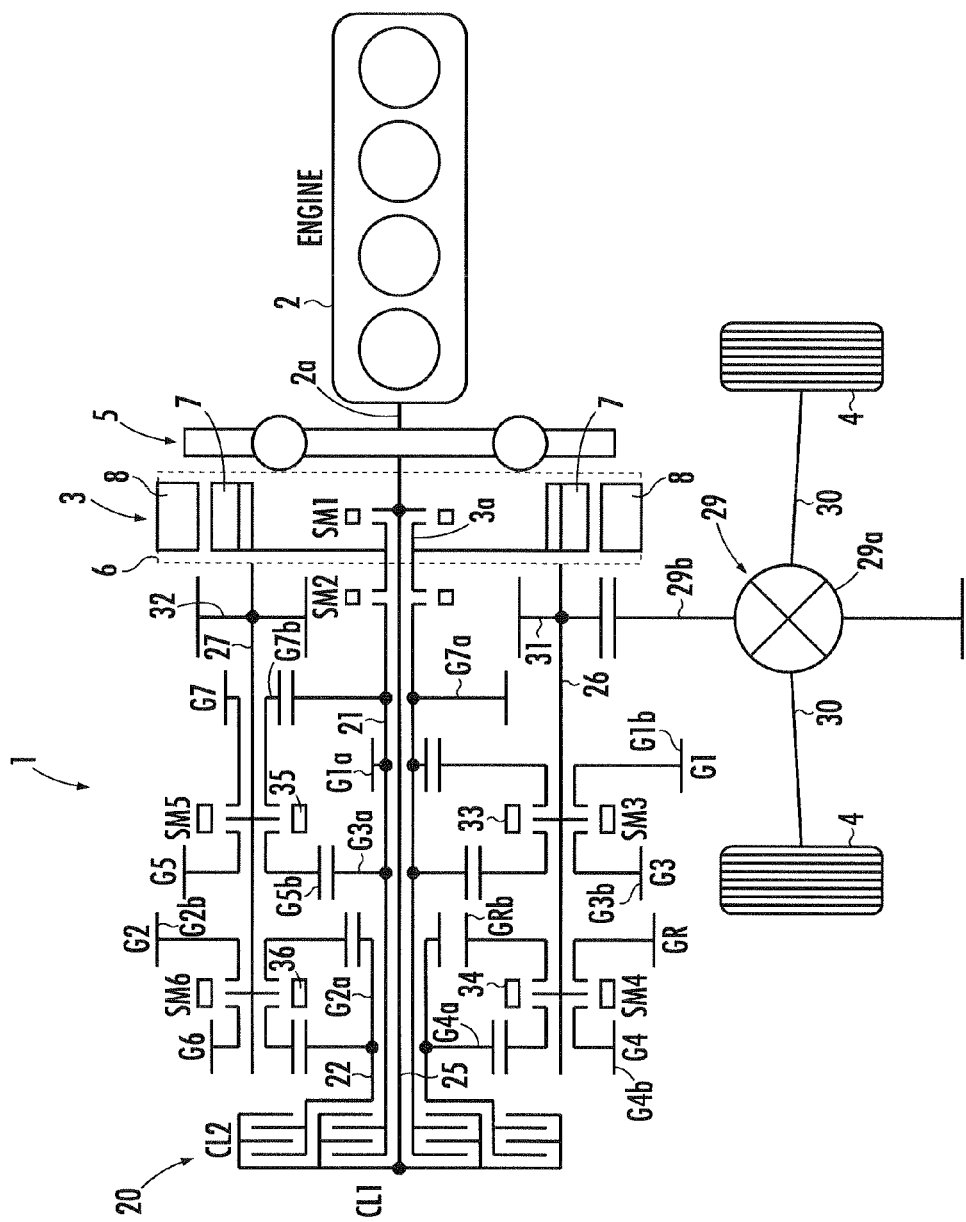
[FIG. 1] A diagram showing the total configuration of the power device of the first embodiment of the present invention.

FIG. 1 shows a power device installed in a hybrid vehicle of a first embodiment. The power device comprises a transmission 1, an engine 2 and an electric motor 3 as the motor, and is configured to transmit the power of the engine 2 or the electric motor 3 to a pair of drive wheels 4, 4 via the transmission 1, and enabling to drive the drive wheels 4, 4 as the driven section.

In the present embodiment, the engine 2 is an internal combustion engine generating power (torque) by combusting fuel such as gasoline, light oil, and alcohol or the like. The engine 2 has an output shaft (crank shaft) 2a for outputting the generated power to outside. This engine 2, similar to normal vehicle engines, by controlling the opening degree of a throttle valve comprising an air intake conduit not illustrated (i.e. to control the intake air amount of the engine 2), adjusts the output power of the engine 2 via an output shaft 2a. A flywheel 5 is provided at the engine output shaft 2a, and a transmission input shaft 25 which rotates together with the output shaft 2a is also provided.

The electric motor 3 is a three phase DC brushless motor in the present embodiment, and includes a rotor (rotating body) 7 rotatably supported inside a housing 6, a stator 8 fixed to the housing 6 in the circumference of the rotor 7, and an output shaft 3a for transmitting the power (torque) generated at the rotor 7 to outside. The rotor 7 is equipped with a plurality of permanent magnets, and the stator 8 is equipped with a coil 8a (armature winding) for three phases. Here, the housing 6 of the electric motor 3 is fixed to an unmoving portion which is still with respect the vehicle body such as an external packaging case of the motor device or the like.

The electric motor output shaft 3a is fixed to have coaxial core with the rotor 7 in order to rotate integrally with the rotor 7, and is configured connectably with the transmission input shaft 25 via a first connection device (SM1). Moreover, the electric motor output shaft 3a is configured connectably with a first input shaft 21 or a second input shaft 22, which will be described later, via a second connection device (SM2).

The first connection device (SM1) is composed of a (first) synchronous engaging mechanism (synchromesh) arranged inside the rotor 7 of the electric motor 3, to have coaxial core with the output shaft 2a of the engine 2 and the output shaft 3a of the electric motor 3. Similarly, the second connection device (SM2) is composed of a (second) synchronous engaging mechanism arranged outside the electric motor 3, configured coaxially with the output shaft 2a of the engine 2 and the output shaft 3a of the electric motor 3.

The coil 8a of the electric motor 3 is electrically connected with a battery (secondary battery) as the direct-current power source via a power-drive-unit (PDU) which is a driving circuit including an inverter circuit not illustrated. Moreover, the PDU is electrically connected to an electronic control unit (ECU) which performs the motion control of the power device including the electric motor 3. And, it is configured that the power (torque) which the electric motor 3 outputs from the rotor 7 via the output shaft 3a is adjusted by controlling the current flowing to the coil 8a via the PDU, by the ECU. In this case, by controlling the PDU, the electric motor 3 performs a power traveling operation which generates power traveling torque to the rotor 7 by the electric energy supplied from the battery and performs regenerative operation for generating regenerative torque (electric generation braking torque) to the rotor 7, while generating power by the mechanical energy (rotational energy) provided to the rotor 7 via the electric output shaft 3a from outside and charging the generated power energy to the battery.

The above ECU is an electric circuit unit including CPU, RAM, ROM, and interface circuit or the like, and performs the motion control of the power device by executing a control process regulated by a program implemented beforehand. In this case, in addition to the function of controlling the operation of the electric motor 3 via the PDU, a function of controlling the operation of the engine 2 via an actuator for controlling the engine such as an actuator for the throttle valve or the like, not illustrated, and a function of controlling the operation of the twin clutch unit 20 which will be described later, via a drive circuit or an actuator, not illustrated, is included as a function realized by the control process of the ECU.

The transmission 1 comprises the twin clutch unit 20, a hollow first input shaft 21 into which the transmission input shaft 25 is inserted, a hollow second input shaft 22 arranged on the same axis with the first input shaft 21 and interpolating the first input shaft 21, gear trains G1 to G7, and GR having different gear ratio (gear ratio of the driven gear and the drive gear) arranged sequentially from the engine 2 side. Here, the reference signs (G1 to G7, GR) of each gear train represents the number of gear stage of gear ratio (first speed to seventh speed, and reverse), respectively.

The transmission input shaft 25 is connected to have coaxial core to the output shaft 2a so as to rotate integrally with the output shaft 2a of the engine 2. In this case, the transmission input shaft 25 can be intermittent (connected/disconnected) with respect the rotor 7 and the output shaft 3a of the electric motor 3 by the first connection device (SM1).

The twin clutch unit 20 includes a first clutch (CL1) and a second clutch (CL2) coaxial with the transmission input shaft 25, and is configured to transmit the rotation of the transmission input shaft 25 to the first input shaft 21 via the first clutch (CL1) and to the second input shaft 22 via the second clutch (CL2), respectively.

The above first and the second clutches CL1 and CL2 are clutch mechanisms which operates so as to connect and disconnect between the transmission input shaft 25 and the first and second input shafts 21, 22 under the control of the ECU (a clutch which is able to selectively operate in a connecting state and a disconnecting state). That is, the first and second clutches CL1 and CL2 are composed of frictional engagement mechanism, which releasably transmits the rotation of the transmission input shaft 25 which coordinates with the engine output shaft 2a to the first input shaft 21 and the second input shaft 22, respectively.

Each gear train G1 to G7 is composed of respective drive gears G1a to G7a and driven gears G1b to G7b which engages with each drive gear. Here, the drive gears G1a, G3a (common for G3 and G5), and G7a of the odd-numbered in gear ratio order gear trains G1, G3, G5, and G7 are fixed to the first input shaft 21, and the drive gears G2a (common for G2 and GR) and G4a (common for G4 and G6) of the gear trains of the even-numbered gear ratio order and rear gear, G2, G4, G6, and GR are fixed to the second input shaft 22.

Moreover, the transmission 1 has two output shafts 26, 27, and the driven gears G1b, G3b, G4b, and GRb, which engages with the drive gears G1a, G3a, G4a, and G2a of the gear trains G1, G3, G4, and GR, are pivotally supported on the first output shaft 26, and the driven gears G2b, G5b, G6b, and G7b, which engages with the drive gears G2a, G3a, G4a, and G7a of the gear trains G2, G5, G6, and G7, are pivotally supported on the second output shaft 27.

In addition, a third synchronous engaging (synchromesh) mechanism SM3 which selectively connects the driven gear G1b of the first gear train G1 and the driven gear G3b of the third gear train G3 to the first output shaft 26, and a fourth synchronous engaging mechanism SM4 which selectively connects the driven gear G4b of the fourth gear train G4 and the driven gear GRb of the reverse gear train GR to the first output shaft 26, is arranged on the first output shaft 26. And, a fifth synchronous engaging mechanism SM5 which selectively connects the driven gear G5b of the fifth gear train G5 and the driven gear G7b of the seventh gear train G7 to the second output shaft 27, and a sixth synchronous engaging mechanism SM6 which selectively connects the driven gear G2b of the second gear train G2 and the driven gear G6b of the sixth gear train G6 to the second output shaft 27, is arranged on the second output shaft 27.

The third and fourth synchronous engaging mechanisms SM3, SM4 are whirl-stopped at the first output shaft 26, and comprises synchronize sleeves 33, 34 movable in the axial direction by an actuator not illustrated. By moving the synchronize sleeve 33 of the third synchronous engaging mechanism SM3 from the illustrated neutral position N to the driven gear G1b or G3b side, the driven gear G1b or G3b is connected to the first output shaft 26, thereby selectively establishing the first gear train G1 or the third gear train G3. Similarly, by moving the synchronize sleeve 34 of the fourth synchronous engaging mechanism SM4 from the illustrated neutral position N to the driven gear GRb or G4b side, the driven gear GRb or G4b is connected to the first output shaft 26, thereby selectively establishing the reverse gear train GR or the fourth gear train G4.

Moreover, the fifth and sixth synchronous engaging mechanisms SM5, SM6 are whirl-stopped at the second output shaft 27, and comprises synchronize sleeves 35, 36 movable in the axial direction by an actuator not illustrated. By moving the synchronize sleeve 35 of the fifth synchronous engaging mechanism SM5 from the illustrated neutral position N to the driven gear G5b or G7b side, the driven gear G5b or G7b is connected to the second output shaft 27, thereby selectively establishing the fifth gear train G5 or the seventh gear train G7. Similarly, by moving the synchronize sleeve 36 of the sixth synchronous engaging mechanism SM6 from the illustrated neutral position N to the driven gear G2b or G6b side, the driven gear G2b or G6b is connected to the second output shaft 27, thereby selectively establishing the second gear train G2 or the sixth gear train G6.

Here, "establishing a gear train" means to become a power transmitting state from the input shafts 21, 22 to the corresponding output shafts 26, 27 via the gear trains G1 to G7, or GR.

The above first and second transmission output shafts 26, 27 are established in parallel arrangement with the transmission input shaft 25, and are connected to the drive wheels 4, 4, via a differential gear unit 29 between the drive wheels 4, 4. In detail, the differential gear unit 29 comprises a gear case 29a containing therein a side gear (illustration abbreviated) connected to the drive wheels 4, 4 via axles 30, 30, respectively, and a gear 29b fixed to the outer periphery of the gear case 29a. Then, an output gear 31 or 32, which is fixed to one end portion of the first transmission output shaft 26 or the second transmission output shaft 27, is engaged to a gear 29b of the differential gear unit 29. According to this, the transmission output shafts 26, 27 are configured to rotate the drive wheels 4, 4 via the differential gear unit 29.

Next, the actuation of the first embodiment will be described. The following activation is performed under the control by the ECU.

[Engine Starting]

For example, in a case when it is not possible to EV start-moving (which is determined by the ECU) when the outside temperature is low or the battery voltage SOC is decreasing, it is able to start the engine 2 by the electric motor 3.

Figure 2:
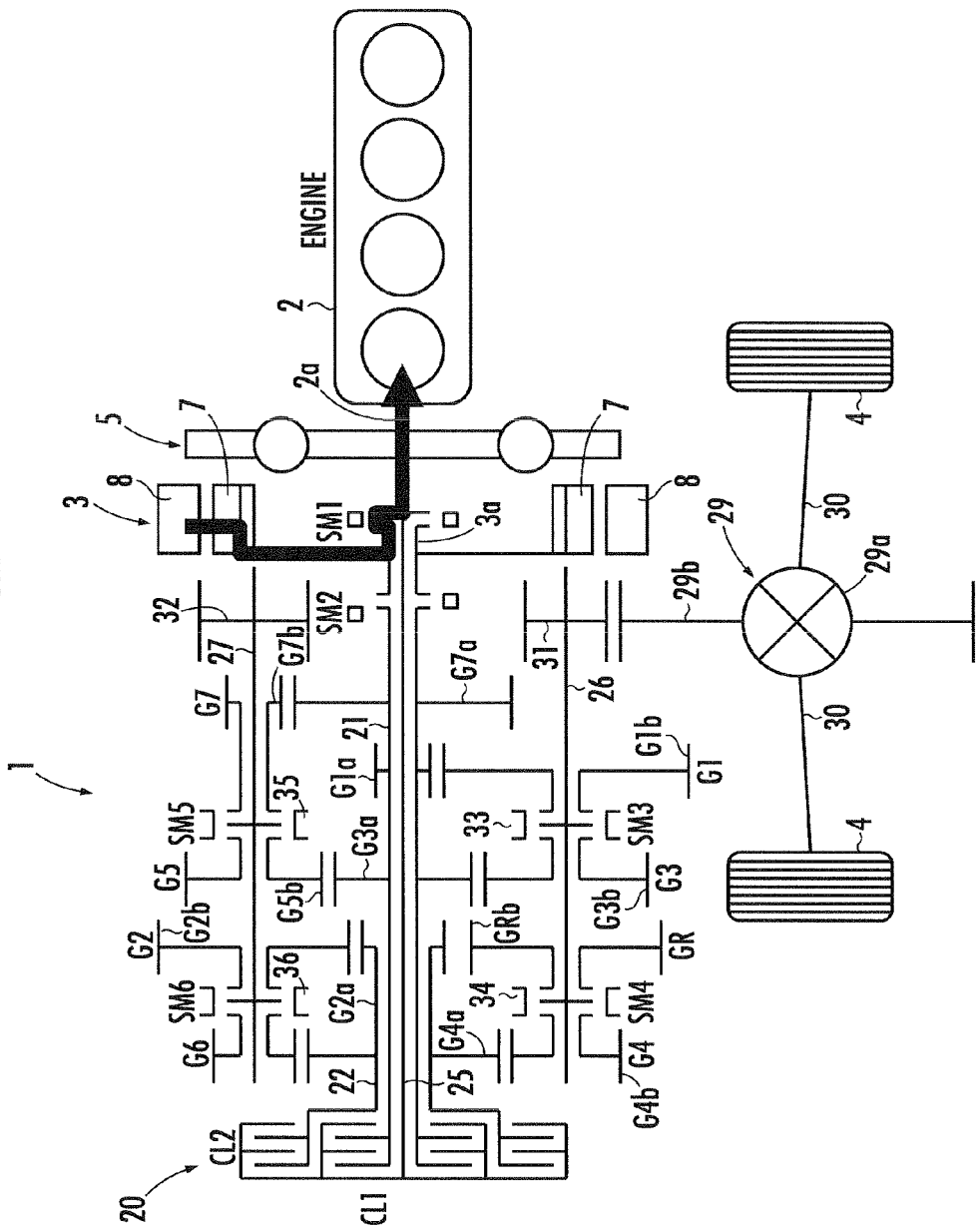
[FIG. 2] A diagram showing the connection state at the time of engine start of the first embodiment.

More specifically, in advance, the first connection device SM1 is fastened (set to a first operation state), while the second connection device SM2 is interrupted (set to a second operation state). By this, as shown by the bold line of FIG. 2, the output shaft 3 of the electric motor 3 is in a state connected to the engine output shaft 2a which is connected to the transmission input shaft 25.

In this state, when the vehicle brake is released, it is able to start the engine 2 via the output shaft 2a by driving the electric motor 3. Here, when the first clutch CL1 or the second clutch CL2 of the twin clutch unit 20 becomes an engaged state, power is transmitted to the first input shaft 21 or the second input shaft 22 from the transmission input shaft 25, thereby transmitting power to the first output shaft 26 or the second output shaft 27 via the gear trains. By this, the drive wheels 4, 4 are driven via the output gears 31 or 32, and the vehicle is able to immediately start moving.

In contrast, in a power mechanism comprising conventional twin clutch, since the engine is started from the electric motor via the twin clutch, control power for engaging the clutches was necessary before starting the engine. In the present embodiment, it is able to start the engine 2 directly by the electric motor 3, the control power for engaging clutches before starting the engine is not necessary.

[Reverse Start-Moving]

First, similar to when starting the engine as above, the first connection device SM1 is fastened and the engine 2 is started by the electric motor 3. Next, when the fourth synchronous engaging mechanism SM4 is set to the reverse (R) side, as described before, the driven gear GRb of the reverse gear train GR is connected to the first output shaft 26 and the reverse gear train GR is established.

Figure 3:
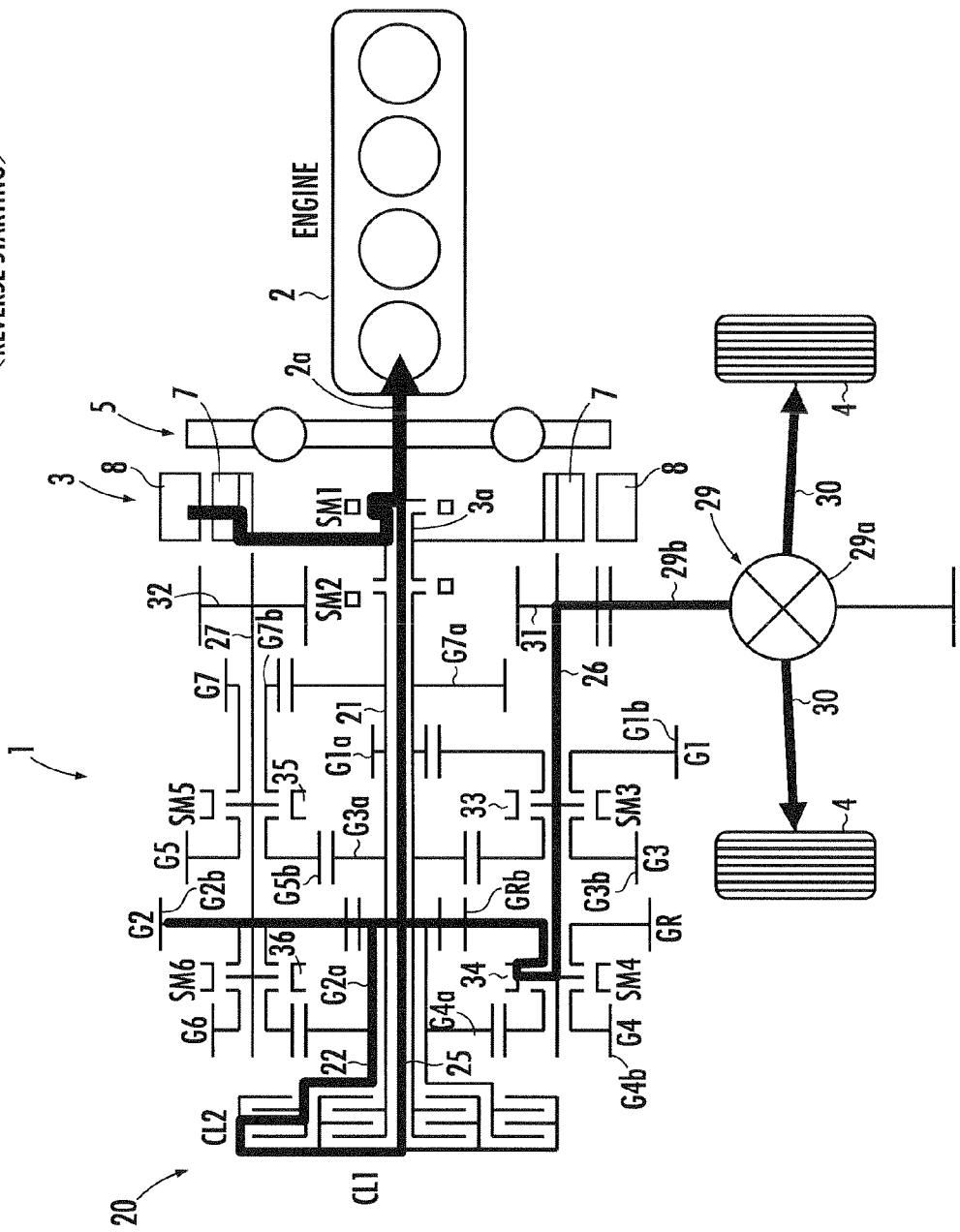
[FIG. 3] A diagram showing the connection state at the time of reverse start-moving (backward moving) of the first embodiment.

Therefore, after starting the engine 2, when the second clutch CL2 of the twin clutch unit 20 becomes an engaged state, as shown in bold line of FIG. 3, since the power is transmitted to the second input shaft 22 from the transmission input shaft 25 which is connected to the engine output shaft 2a, power is transmitted to the first output shaft 26 via the reverse gear train GR. By this, the drive wheels 4, 4 are driven via an output gear 31, and the vehicle is able to immediately start reverse moving, that is to move backward. In this case, the electric motor 3 appropriately performs engine assist or regenerative operation.

[EV Start-Moving~Engine Traveling~EV Cruise Traveling]

Figure 4:
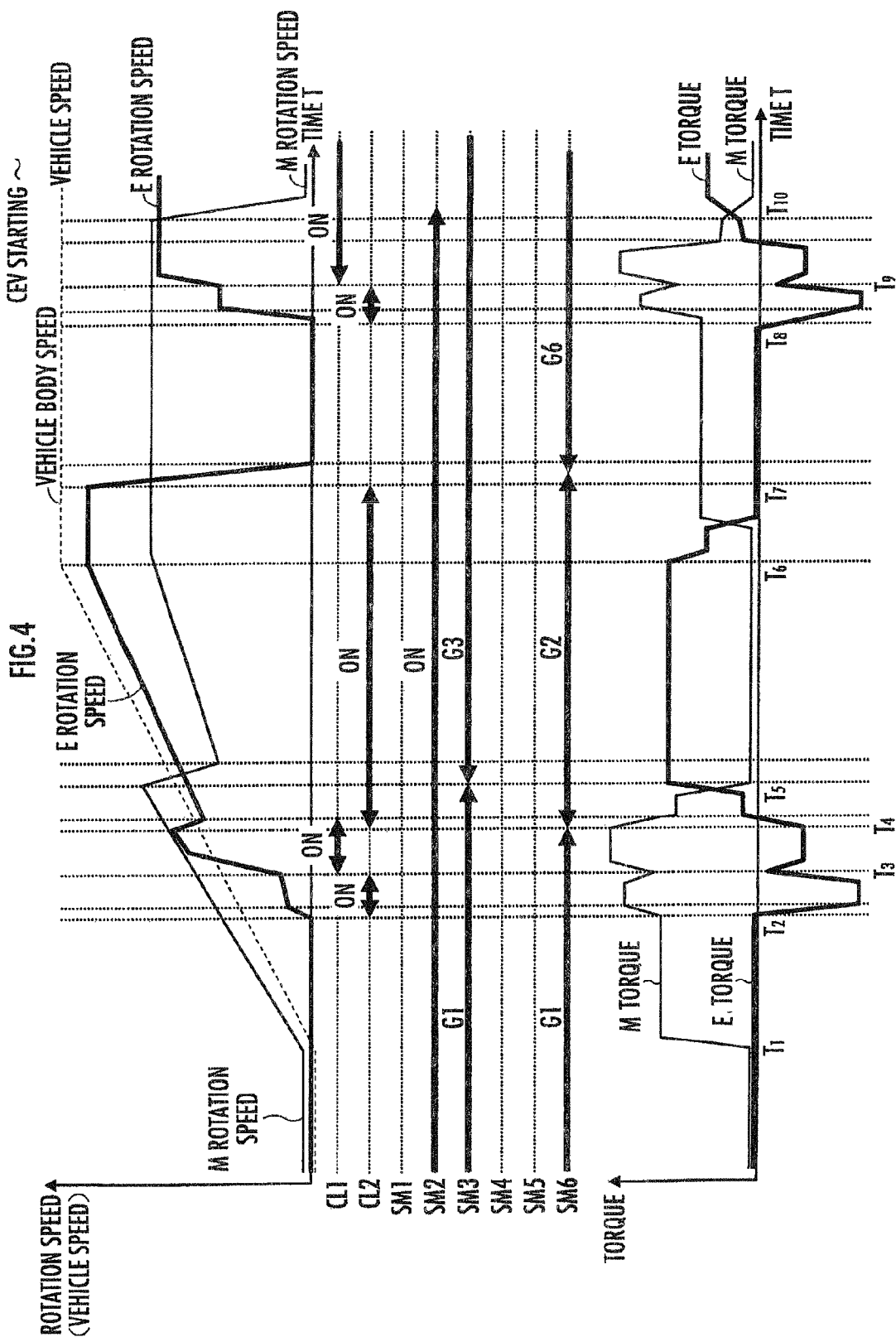
[FIG. 4] A diagram showing the operation state at the time of EV start-moving/traveling of the first embodiment.

In FIG. 4, the graph in the upper column indicates, with respect the elapsed time T, the change of the engine rotation speed (noted as "E rotation speed") by a bold line, the change of the electric motor rotation speed (noted as "M rotation speed") by a thin line, and the speed of the vehicle body (vehicle speed) by a dashed line. In the middle column, an engaged (connected) state (noted as ON) of the first clutch CL1, the second clutch CL2, the first connection device (synchronous engaging mechanism) SM1, the second connection device SM2 is indicated by a bold line, and also a state of the third to sixth synchronous engaging mechanisms SM3 to SM6 establishing one of the corresponding two gear trains, respectively, is indicated by a bold line. Here, where there is no bold line shown, indicates that CL1, CL2, SM1, SM2 is in an unengaged (disconnected) state, or SM3 to SM6 are at the neutral position N. The graph in the lower column indicates, with respect the elapsed time T, the change of the engine torque (noted as "E torque") by a bold line, the change of the electric motor torque (noted as "M torque") by a thin line.

(1) EV Start-Moving

When the vehicle is stopped, in a case where it is determined that the battery SOC is equal to or more than a predetermined value and the engine is in a warm condition, "EV start-moving" mode is adopted, and is controlled as shown in FIG. 4 as described below.

Beforehand, SM2 is set to ON, SM3 is set to G1 side (first speed), SM6 is set to G6 side (sixth speed), respectively. When the accelerator pedal is stepped on at an arbitrarily time point (T=T1), the electric motor is activated (the M torque is approximately constant), and while CL1 and CL2 are maintained released (disconnected), and the rotation of the electric motor output shaft 3a is transmitted to the first input shaft 21 via SM2. Then, since the rotation is transmitted to the first output shaft 26 via the gear train G1 established by SM3, the EV start-moving is at first speed, and the vehicle speed increases as shown by the dashed line. The engine 2 is halted (E torque=0) at this time.

(2) M Torque Increase, Engine Sixth Speed Activation

When the vehicle body speed or the demand drive force becomes equal to or more than a predetermined value (T=T2), the engine 2 is started. At this time, when the second clutch CL2 is (fastened) ON, the rotation of the transmission input shaft 25 is transmitted to the second input shaft 22. Then, since the rotation is transmitted to second output shaft 27 via the gear train G6 established by SM6, engine is activated at sixth speed. Similarly, necessary torque (=engine activating torque×sixth speed ratio/first speed ratio/transmission transfer efficiency) for activating the engine is added so as not to lose traveling driving force at the electric motor 3 side. That is, with respect the engine being activated at sixth speed, by the electric motor 3 being activated at first speed and increasing M torque, the engine 2 can be activated with less torque.

(3) Engine Starting by Shifting the Engine to First Speed and Increasing E Rotation Speed When the engine 2 is activated (T=T3), the operation state of the two clutches of the twin clutch unit 20 is switched. That is, CL2 is not actuated (released) and CL1 is ON (fastened), by which the rotation of the transmission input shaft 25 is transmitted to the first input shaft 21 and not to the second input shaft 22. Then, the rotation is transmitted to the first output shaft 26 via the gear train G1 which is established by SM3, thereby activating the engine at first speed. At the same time, at the electric motor 3 side, similar to the above (2), by adding the torque necessary to increase the E rotation speed, the loss of traveling drive force is prevented. And then, when the E rotation speed becomes equal to or more than a predetermined value, the engine is started by fuel injection and ignition.

(4) Engine Second Speed

After that, SM6 is set to G2 side at time point T=T4, and the operation state of the two clutches are switched again. That is, CL1 is not actuated and CL2 is ON (fastened), by which the rotation of the transmission input shaft 25 is transmitted to the second input shaft 22. Then, the rotation is transmitted to the second output shaft 27 via the gear train G2 which is established by SM6, and the engine traveling is changed to second speed.

(5) Shifting the Electric Motor 3 to Third Speed While Traveling at Engine Second Speed After that, when SM3 is switched from G1 side to G3 side at time point T=T5, the rotation of the electric motor output shaft 3a is transmitted to the first output shaft 26 from the first input shaft 21 via the gear train G3, thereby the electric motor 3 is shifted to third speed. At the same time, while reducing M torque to 0, E torque is increased so that the total drive force equals to the desired value.

(6) Adding Electric Motor Torque According to the Demanded Drive Force

In a case where the demanded drive force becomes equal to or more than a predetermined value during engine traveling, M torque is added. Furthermore, in a case where the battery voltage SOC becomes equal to or less than a predetermined value, charging is performed at the electric motor 3, and at the same time, E torque is added to ensure total drive force. Then, at a time point (T=T6) when the vehicle speed becomes constant, E torque is gradually reduced.

(7) Cruise Traveling

During engine traveling, in a case where the demand drive force is equal to or less than a predetermined value, the vehicle body speed is within a predetermined range, and the battery voltage SOC is equal to or more than a predetermined value, the ECU determines that EV cruise traveling is possible, and at that time point (T=T7), CL2 is switched to non-actuated (released). By this, the rotation of the transmission input shaft 25 is not transmitted to either of the first input shaft 21 or the second input shaft 22, thereby halting the engine (E torque=0) or cutting off the fuel supply by halting all cylinders. Furthermore, SM6 is switched from G2 to G6 side.

Here, the determination of whether to stop the engine or to halt the cylinders is determined based on mode changing switch or car navigation information.

(9) Starting the Engine at Third to Sixth Speed When Reaccelerating

During the above EV cruise traveling, EV traveling is at third speed, since the rotation of the electric motor output shaft 3a is transmitted from the first input shaft 21 to the first output shaft 26 via the gear train G3. During this EV traveling, in a case where engine drive is performed by reacceleration, since SM2 is set ON, SM3 is set to G3 side (third speed), and SM6 is set to G6 side (sixth speed), when CL2 becomes ON (fastened) at a time point (T=T8), similar to the above situation (2), the rotation of the transmission input shaft 25 is transmitted to the second output shaft 27 from the second input shaft 22 via the gear train G6, thereby the engine is activated at sixth speed.

And then, at time point T=T9, when CL2 is non-actuated (released) and CL1 is ON (fastened), the rotation of the transmission input shaft 25 is transmitted to the first input shaft 21, and to the first output shaft 26 via gear train G3, the engine 2 is started at third speed. At the same time, at the electric motor 3 side, similar to the above (2), the loss of traveling drive force is prevented by adding torque necessary to increase the E rotation speed.

After that, in a case the electric motor 3 is not used, at time point T=T10, SM2 is switched to disconnected side and the electric motor is halted (M rotation speed=0).

According to the control method of above (1) to (9), the torque required for engine starting is lessened. For example, if the first speed ratio=12 and the sixth speed ratio=2, the torque necessary for engine activation is only 120 (Nm)×2/12=20 (Nm). Therefore, electric motor traveling and engine starting is possible by one electric motor without using a separate starter (ignition motor) ISG., thereby omitting ISG and reducing weight and cost to a large amount.

[High Speed Traveling]

Figure 5:
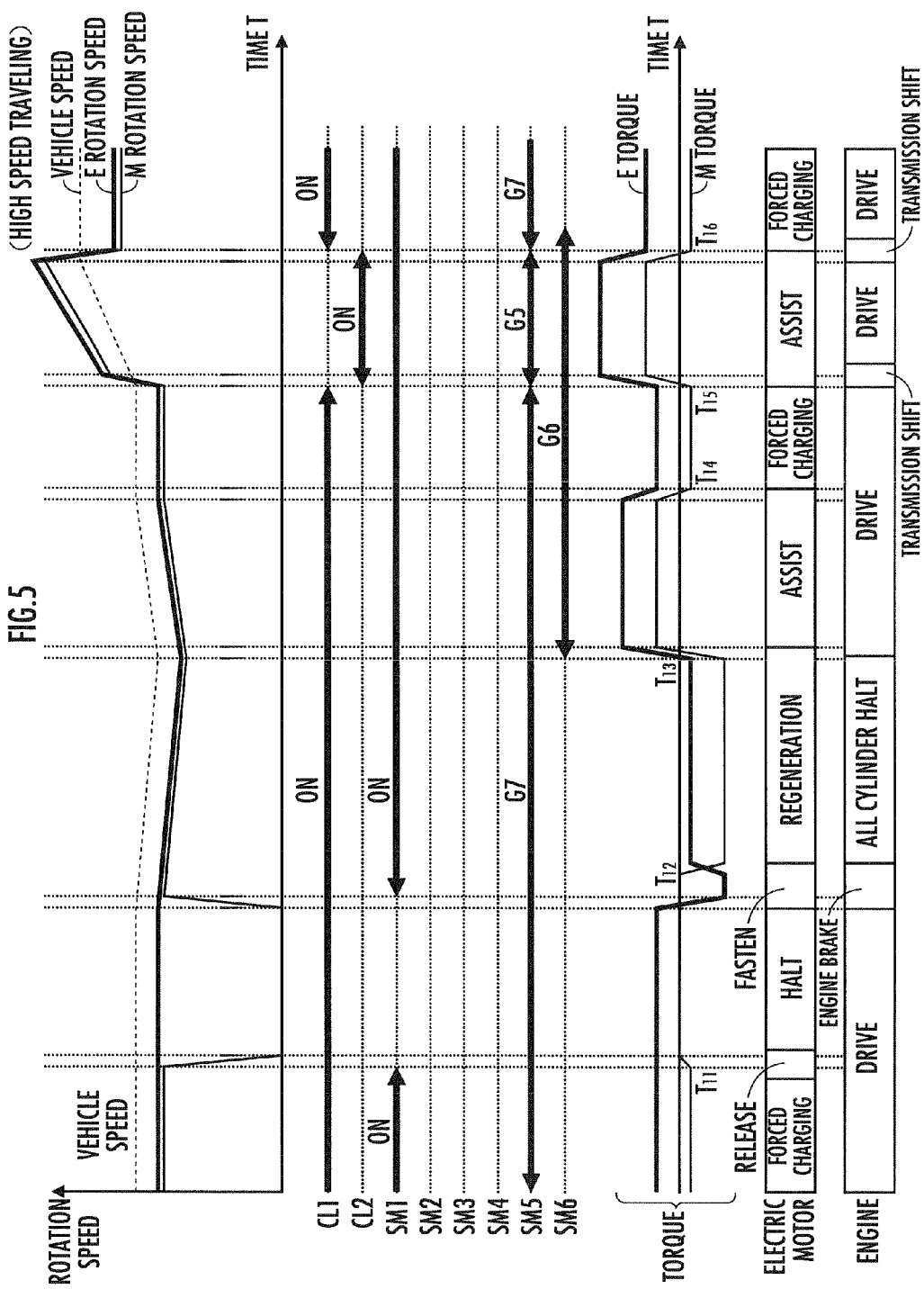
[FIG. 5] A diagram showing the operation state at the time of high speed traveling of the first embodiment.

FIG. 5 is an explanatory diagram of the control method at the time of high speed traveling, and similar to FIG. 4, indicates with respect the elapsed time T, the change of the E rotation speed, the M rotation speed, and the speed of the vehicle body (vehicle speed), and the connect (ON)/disconnect of CL1, CL2, SM1, and SM2, the establishment of gear trains by SM3 to SM6, and the change of E torque and M torque respect the elapsed time T. Furthermore, in the lower column, the state of each of the electric motor 3 and engine 2 is shown.

As shown in FIG. 5, during high speed traveling, unless the electric motor 3 is stopped, the drive assist, the electric power regeneration, or the forced charging is performed in a state where SM 1 is ON and the electric motor 3 is connected to the engine 2 side.

By this, the torque responsiveness is increased at the time of the drive assist and the regeneration of the electric motor, and the decrease of responsiveness, due to the electric motor torque becoming 0 when the gear train is established beforehand (during pre-shift), is prevented.

[Deceleration Traveling]

Figure 6:
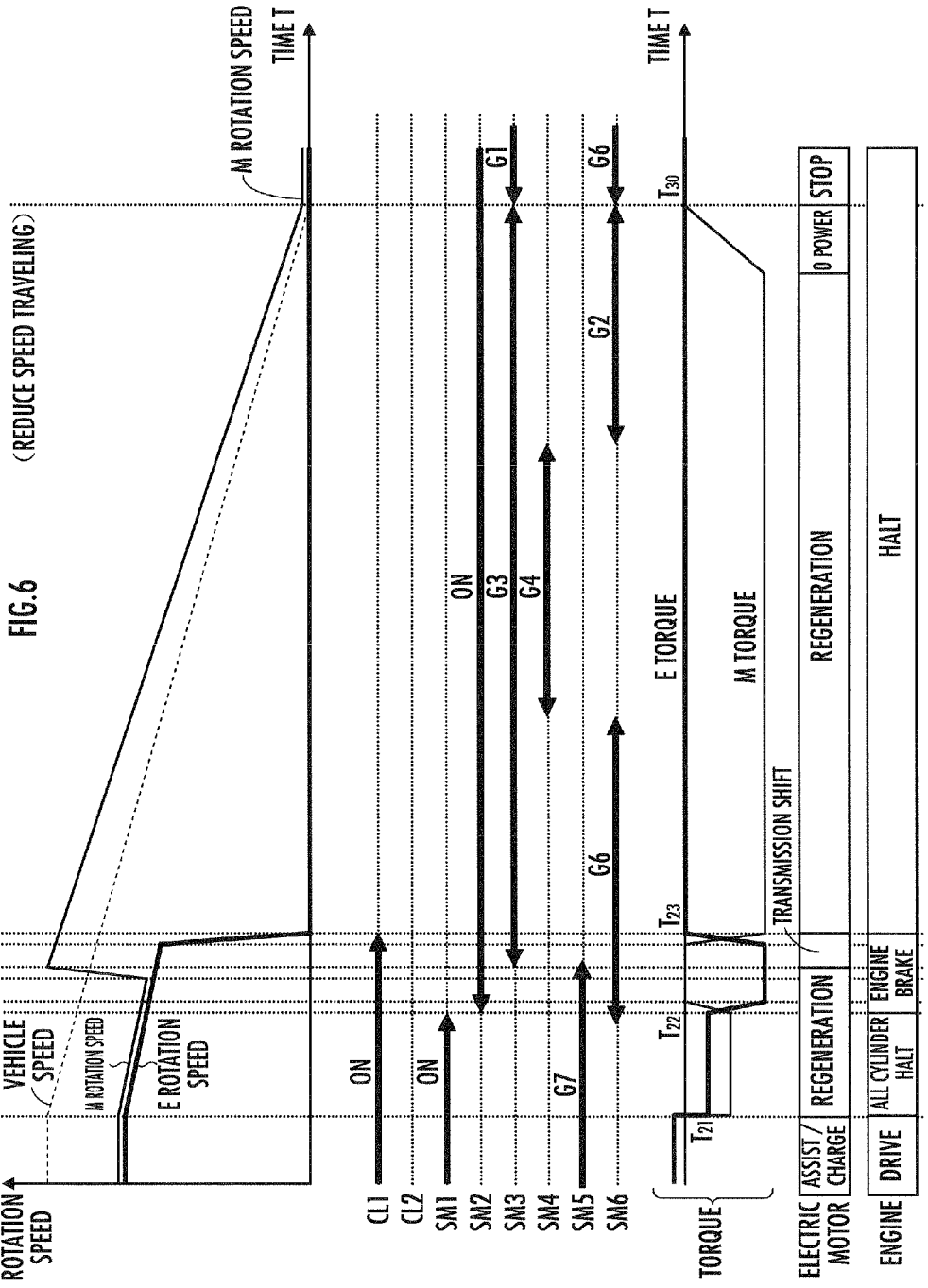
[FIG. 6] A diagram showing the operation state at the time of deceleration traveling of the first embodiment.

FIG. 6 is an explanatory diagram of the control method at a time of traveling by reducing speed, and similar to FIG. 5, indicates with respect the elapsed time T, the change of the E rotation speed, the M rotation speed, and the speed of the vehicle body (vehicle speed), and the connect (ON)/disconnect of CL1, CL2, SM1, and SM2, the establishment of gear trains by SM3 to SM6, and the change of E torque and M torque respect the elapsed time T. Furthermore, in the lower column, the state of each of the electric motor 3 and engine 2 is shown.

In FIG. 6, during when the electric motor is in the regeneration state at time point T=T21 at which the speed is reduced by halting all cylinders of the engine from the high speed traveling of the above FIG. 5, the SM2 is set ON and SM3 is set to the G3 side at time point T=T22 and the electric motor is fixed to third speed traveling. Then at time point T=T23, CL1 and CL2 are both switched to the disconnected state and the engine is halted. Furthermore, by the time from time point T=T22 until when SM3 is switched to G1 side (T=T30), by setting the operation state of SM6 and SM4 so as to pre-shift the even-numbered gear stage of gear trains G6, G4, G2 to stand-by, the response delay when restarting the engine is minimized.

[From Speed Reduction Traveling to Reacceleration]

Figure 7:
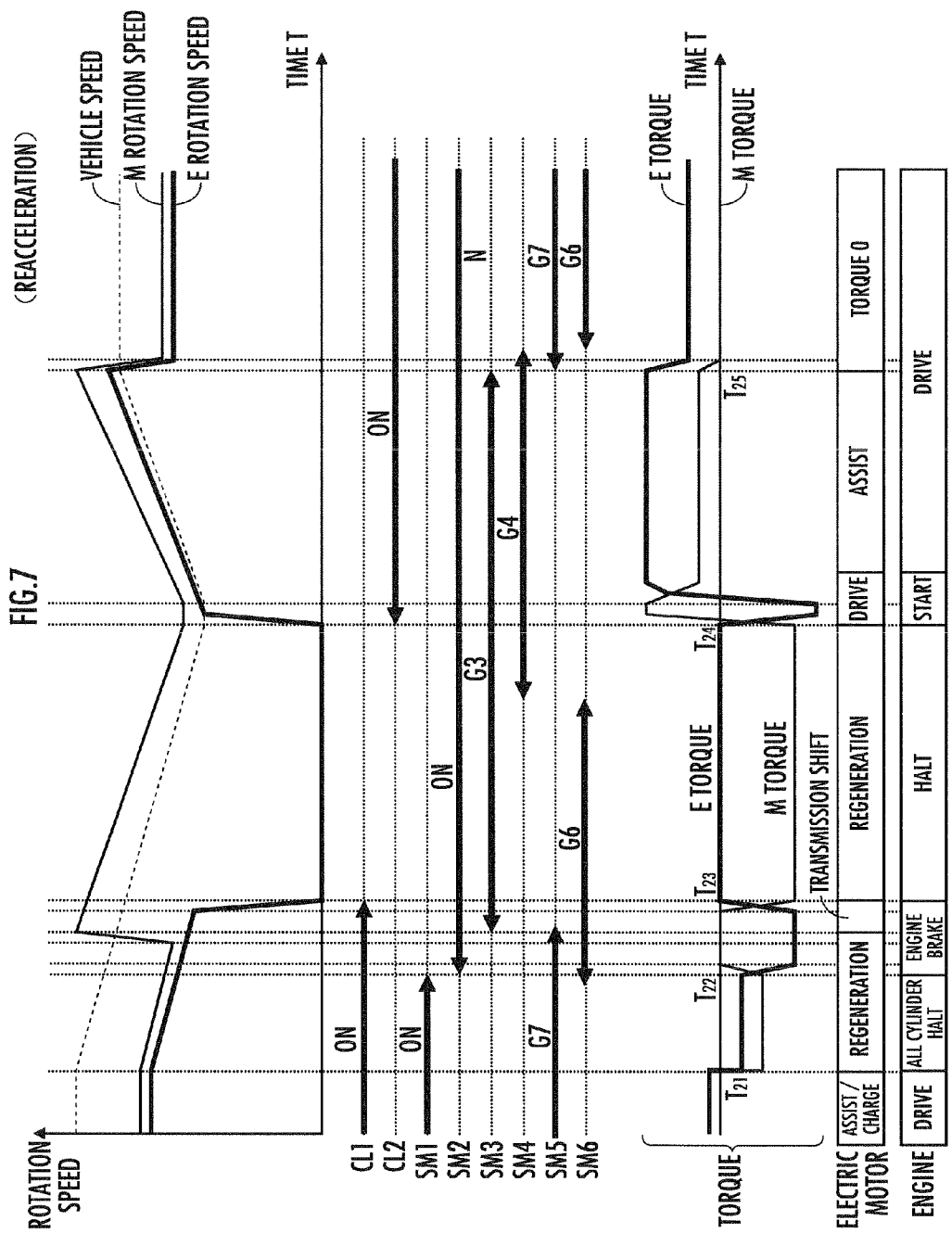
[FIG. 7] A diagram showing the operation state at the time of re-acceleration from reduced speed traveling of the first embodiment.

FIG. 7 is an explanatory diagram of the control method in a case of reacceleration from speed reduction traveling, and similar to FIGS. 5 and 6, indicates with respect the elapsed time T, the change of the E rotation speed, the M rotation speed, and the speed of the vehicle body (vehicle speed), and the connect/disconnect of CL1, CL2, SM1, and SM2, the establishment of gear trains by SM3 to SM6, and the change of E torque and the M torque respect the elapsed time T. Furthermore, in the lower column, the state of each of the electric motor 3 and engine 2 is shown.

In FIG. 7, as shown in previous FIG. 6, during speed reduction regeneration, CL1 and CL2 are both in a disconnected state and the engine is halted (T=T23), and SM2 is set ON and SM3 is set to G3 side, and the electric motor is fixed to third speed traveling. Here, when CL2 becomes ON (T=T24), the rotation of the transmission input shaft 25 is transmitted to the second input shaft 22. Then, the rotation is transmitted to the second output shaft 27 via the gear train G4 established by SM4, and the engine restarts at fourth speed. At this time, by increasing the M torque, the E rotation speed is raised and it is able to quickly start the engine.

After that, when SM3 is switched from G3 side to neutral position N at time point T=T25, since the rotation of the transmission output shaft 3a is not transmitted to the first output shaft 26, the electric motor 3 becomes to a torque 0 state, and it becomes to a state of traveling in a constant vehicle speed by the engine drive.

Before the above described reacceleration, by setting the operation state of SM4 and SM6 so as to pre-shift gear trains G6 and G4 of even-numbered gear stages to stand-by, it is able to minimize the response delay at the time of restarting the engine.

[Switching from EV Traveling to Engine Traveling]

Figure 8:
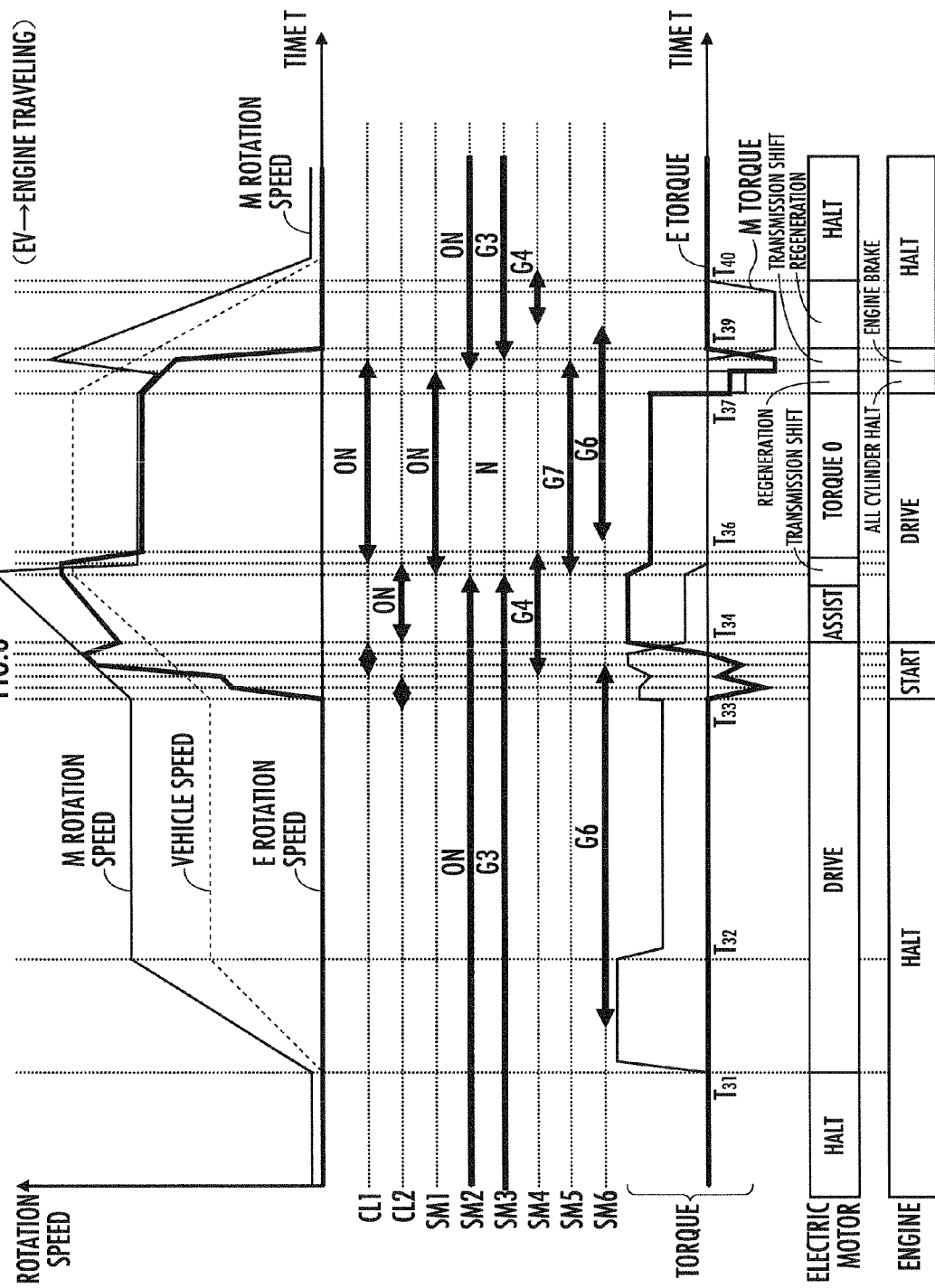
[FIG. 8] A diagram showing the operation state of switching from EV traveling to engine traveling of the first embodiment.

FIG. 8 is an explanatory diagram of the control method in a case of switching from EV traveling mode to engine traveling mode, and similar to FIGS. 5 to 7, indicates with respect the elapsed time T, the change of the E rotation speed, the M rotation speed, and the speed of the vehicle body (vehicle speed), and the connect/disconnect of CL1, CL2, SM1, and SM2, the establishment of gear trains by SM3 to SM6, and the change of E torque and M torque respect the elapsed time T. Furthermore, in the lower column, the state of each of the electric motor 3 and engine 2 is shown.

As shown in FIG. 8, in EV traveling mode, before EV start-moving (T=T31) in an engine halt state by having both CL1 and CL2 in a disconnected state, the vehicle stands-by at third speed traveling by having SM2 ON and SM3 pre-shifted to G3 side. Then, starting by EV as previously described, gear shift stages G3 and G6 are fixed during EV traveling at a constant speed from time point T=T32. After that, CL2 is ON at time point T=T33, the engine is activated at sixth speed by G6, and then CL1 is ON and engine is started at third speed by G3, and CL2 is ON again at time point T=T34, and accelerated at fourth speed by G4 and becomes an engine drive state.

In this engine drive state, when the vehicle speed reaches a predetermined speed (T=T35), while switching to disconnect SM2 and to connect SM1, and by setting SM3 to neutral position N and SM5 to G7 side, the rotation of the electric output shaft 3a is transmitted to the transmission input shaft 25 via the engine output shaft 2a. Here, when CL2 is switched to be disconnected and CL1 to ON, the electric motor output is transmitted from the transmission input shaft 25 to the first input shaft 21, and after shifting speed to maximum seventh speed by G7, the M torque becomes 0 (T=T36).

After that, when all cylinders of engine 2 is halted at time point T=T37, the electric motor 3 becomes the regeneration state, and after the M rotation speed decreases, at time point T=T38, by switching SM1 to disconnect, SM2 to connect, and setting SM3 to G3 side, the electric motor output is shifted to third speed via G3 from the first input shaft 21. And, when M torque is reversed (T=T38) by the engine brake, while the electric motor 3 becomes regeneration state again and the engine 2 is halted at time point T=T39, the electric motor 3 is also halted at time point T=T40 and M torque becomes 0.

[A Modified Example of the Embodiment]

Now, in the above first embodiment, although two synchronous engaging mechanism SM1 and SM2 are separately provided as a connection device connecting the electric motor output shaft 3a to the transmission input shaft 25 and the first input shaft 21 (or the second input shaft 22) so as to enable power transmission, SM1 and SM2 may be combined as one synchronous engaging mechanism. Such example is shown in FIG. 9.

Figure 9:
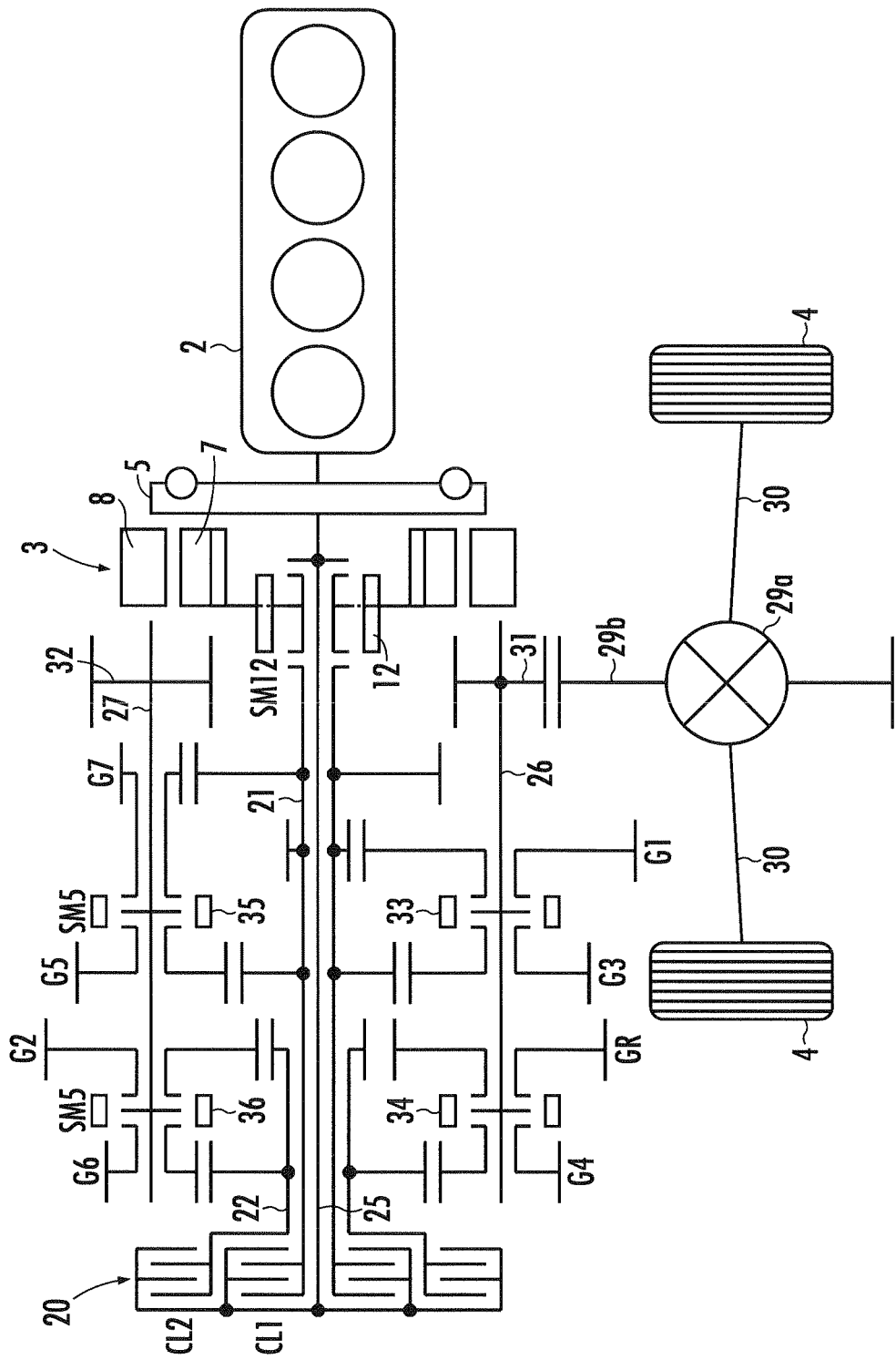
[FIG. 9] A diagram showing the total configuration of a modified example of the first embodiment.

In the embodiment shown in FIG. 9, a synchronous engaging mechanism SM12 which is formed concentric to the transmission input shaft 25 on the side of the twin clutch unit 20 from the inner side of the rotor 7 of the electric motor 3, is disposed. The SM12 is whirl-stopped at the transmission input shaft 25, and comprises the synchronize sleeve 12 movable to the axial direction by an actuator not illustrated.

Here, the synchronize sleeve 12 is configured to be selectively set to one of a first operation position which enables power transmission between the electric motor output shaft 3a and the transmission input shaft 25, a second operation position which enables power transmission between the electric motor output shaft 3a and the first input shaft 21 or the second input shaft 22, and a neutral position which is different from the above two operation positions and does not perform either of the above two power transmissions.

The modified example of FIG. 9 also includes the transmission 1 using the twin clutch unit 20, the engine 2, and the electric motor 3, and performs the following control operation.

Figure 10:
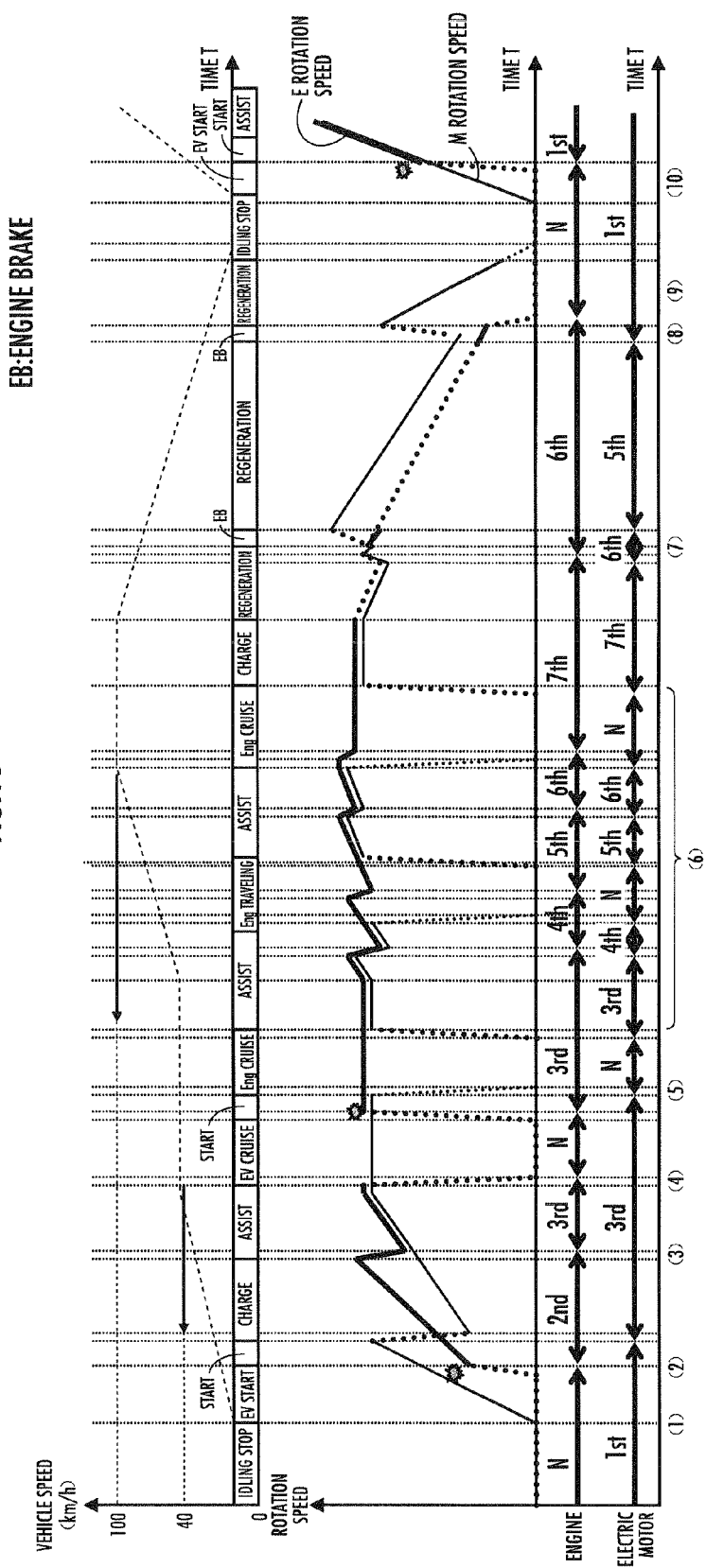
[FIG. 10] A diagram showing the operation state of the embodiment of FIG. 9.

In FIG. 10, the upper column shows, with respect the elapsed time T, the change of the vehicle body speed (vehicle speed) and the state of the vehicle, and the change of E rotation speed is shown by a bold line, the change of the M rotation speed is shown by a thin line, in respect the elapsed time T. In the column below this, there is shown the change of speed stage of each of the engine and the electric motor.

In FIG. 10, first, both the engine and the electric motor are halted, and the electric motor is pre-shifted to first speed in advance. The control is as follows.
(1) Start moving by electric motor first speed.
(2) While establishing even-numbered gears G2, G4, or G6, E rotation speed is increased and started.
(3) The engine is second speed traveling and the electric motor is charged at third speed.
(4) EV cruise traveling at electric motor third speed and the engine is halted.
(5) While establishing odd-numbered gear G1, G3, G5, or G7, starting the engine and perform engine traveling cruise, the electric motor is halted.
(6) During middle to high speed traveling, the engine and the electric motor are integrated (traveling assist and regeneration by the electric motor). The electric motor is halted during engine traveling cruise, and when regenerating, all cylinders of the engine are halted.
(7) When regenerating while reducing speed, the engine is driven at sixth speed, and when regenerating all cylinders are halted. The electric motor is fixed to fifth speed. This seeks to minimize torque by the engine brake and improve responsiveness at the time of re-starting.
(8) Changing speed during speed reduction is performed by switching gear speed stages during releasing all cylinders halt and generating torque by the engine brake.
(9) When regenerating while reducing speed at middle to low speed, the engine is halted and the electric motor is in first speed.
(10) When suddenly start moving, odd-numbered gear G1, G3, G5, or G7 is established, E rotation speed is increased and the engine is started.

[The Second Embodiment]

FIG. 11 shows a schematic structure of a hybrid vehicle comprising the power device of the second embodiment. In the present embodiment, since only the features below differ from the first embodiment, the same reference numerals are indicated regarding the features which are same as the first embodiment and the explanation will be abbreviated.

The present embodiment includes a twin main shaft, and differs from the first embodiment in the following.

The transmission of the present embodiment comprises the twin clutch unit 20, a hollow first input shaft 41 interpolating the transmission input shaft 25 which rotates together with the output shaft 2a of the engine 2, the second input shaft 42 arranged parallel to the first input shaft 41, gear trains G1 to G7, and GR having different gear ratio arranged sequentially from the engine 2 side, and one output shaft 44. The output shaft 44 having one end portion thereof fixed to the output gear 31, and by the output gear 31 engaging with the gear 29b of the differential gear unit 29, it is configured to rotate drive wheels 4, 4 via a differential gear unit 29.

While the first input shaft 41 which is one of the main shafts is connected to the transmission input shaft 25 via the first clutch 1 of the twin clutch unit 20, the second input shaft 42 which is the other main shaft is also connected to the transmission input shaft 25 via the second clutch CL2 which coordinates by an idle gear 43 between the first clutch 1 of the twin clutch unit 20.

Among the above gear trains, the drive gears G1a, G5a, G3a, and G7a of the odd-numbered gear trains in transmission gear ratio order G1, G5, G3, and G7 are connected to the first input shaft 41 via SM7 and SM9 respectively, and the drive gears G1a, G4a, G6a, and GRa of the even-numbered gear trains in the transmission gear ratio order and R gear stage, G2, G4, G6, and GR are connected to the second input shaft 42 via SM8 and SM10, respectively. Furthermore, driven gears G1b, G4b, G3b, and G6b, which are common to each pair of gear trains G1 and G2, G4 and G5, G3 and GR, G6 and G7, are pivotally supported and fixed on the output shaft 31 of the transmission.

Among the above SM7 to SM10 (the seventh to tenth synchronous engaging mechanism), SM7 and SM9 are each whirl-stopped at the first input shaft 41, and comprises synchronize sleeves 37, 39 movable in the axial direction by an actuator not illustrated. By moving the corresponding synchronize sleeves 37, 39 from the illustrated neutral position N to the drive gear G1a or G5a side, drive gear G3a or G7a side, the drive gear G1a or G5a, drive gear G3a or G7a are connected to the first input shaft 41, thereby selectively establishing the gear trains G1 or G5, G3 or G7.

Moreover, SM8 and SM10 are each whirl-stopped at the second input shaft 42 and comprises synchronize sleeves 38, 40 movable in the axial direction by an actuator not illustrated. By moving the corresponding synchronize sleeves 38, 40 from the illustrated neutral position N to the drive gear G2a or G4a side, drive gear G6a or GRa side, the drive gear G2a or G4a, drive gear G6a or GRa are connected to the second input shaft 42, thereby selectively establishing gear trains G2 or G4, G6 or GR.

According to the above second embodiment, a hybrid vehicle comprising a twin main shaft operates similarly to the first embodiment and the same effect is obtained.

In the above embodiments, a synchronous engaging mechanism SM is used as a device to connect the output shaft of the electric motor to the engine output shaft or the input shaft. However, it is not limited thereto, and an appropriate engaging means such as a clutch switchable via an actuator by a switch command may be used.

Moreover, the twin clutch unit is not limited to the structure used in the first embodiment and the second embodiment, and can be any structure which is able to transfer power by two clutches.

INDUSTRIAL APPLICABILITY

As described above, according to the hybrid vehicle of the present invention, the total length and the total width is not enlarged by disposing the electric motor at the downstream side of the clutch of the twin clutch, and by having a transmission not requiring any additional means for enabling operation of the twin clutch from a halt state, it is beneficial for enabling to suppress the weight and cost.

The invention claimed is:
1. A hybrid vehicle comprising an engine and an electric motor as a power source for driving a driven section via a transmission, the transmission comprising;
  a transmission input shaft which transmits power from the engine, and a transmission output shaft which outputs a power for driving the driven section;
  a twin clutch unit having a first clutch and a second clutch coaxially arranged with the transmission input shaft;
  a first input shaft which is connectable to the transmission input shaft via the first clutch and a second input shaft which is connectable to the transmission input shaft via the second clutch;
  gear trains configured to be switchable to connect each of the first input shaft and the second input shaft to the transmission output shaft;
  a first connection device which is capable of being selectively switched between a first operation state for enabling power transmission between an output shaft of the electric motor and the transmission input shaft, and a second operation state for interrupting the power transmission, and a second connection device which is capable of being selectively switched between a first operation state for enabling power transmission between the output shaft of the electric motor and the first input shaft or the second input shaft, and a second operation state for interrupting the power transmission, wherein the first input shaft and the second input shaft are arranged coaxially between the engine and the twin clutch unit, and are driven by the electric motor via the first connection device and the twin clutch unit.

2. The hybrid vehicle according to claim 1, wherein the transmission connects the electric motor to the transmission input shaft via the connection device at a time of cold start or in a case where a battery SOC is not more than a predetermined value, thereby starting the engine by the electric motor.

3. The hybrid vehicle according to claim 1, wherein the first connection device or the second connection device is set to the first operation state according to a state of the vehicle of a time of stopping or immediately before stopping.

4. The hybrid vehicle according to claim 3, wherein a case where EV start-moving by the electric motor is possible according to a state of the power source of the electric motor and the engine, the second connection device is set to the first operation state.

5. The hybrid vehicle according to claim 4, wherein in a case where EV start-moving is possible during vehicle stoppage, the transmission preliminary sets a speed stage of odd-numbered or even-numbered gear stage by switching the gear trains, and when vehicle stoppage is released, the second connection device is set to the first operation state, thereby starting to travel by a drive force of the electric motor, and when a vehicle body speed becomes equal to or more than a predetermined value, a torque of the electric motor is increased, and by engaging the clutch of the gear train side which is not driven, the engine is activated by the drive of the electric motor.

6. The hybrid vehicle according to claim 5, wherein in a case where the engine rotation speed increases to a predetermined rotation speed when the engine is activated, the vehicle travels by starting the engine while maintaining a transmission gear ratio fixed, and when a vehicle body speed is less than a predetermined value, the engine is started after increasing the engine rotation speed to the electric motor rotation speed, and the vehicle travels by changing speed to an arbitrary gear stage by switching gear trains.

7. The hybrid vehicle according to 1 wherein in a case where a reverse gear stage is selected during vehicle stoppage, the transmission preliminarily sets the reverse gear stage by switching the gear trains, and at a time of start-moving, the engine is started by connecting the electric motor and the transmission input shaft via the first connection device, and the vehicle moves backward by the engine drive.

8. The hybrid vehicle according to claim 1, wherein in a case where EV traveling by the electric motor is selected, the transmission sets a predetermined gear shift stage by switching the gear trains, and by setting the second connection device to the first operation state, enables EV traveling by the electric motor at the gear shift stage.

9. The hybrid vehicle according to claim 1, wherein at a time of deceleration traveling, the engine is in a halt state, and a predetermined gear shift stage is set by switching the gear trains of the transmission, and regenerating electric power at the electric motor.

\* \* \* \* \*